United States Patent
Ichida

(10) Patent No.: US 6,305,237 B1
(45) Date of Patent: Oct. 23, 2001

(54) BICYCLE SHIFT CONTROL DEVICE FOR CONTROLLING A GAS ACTUATED SHIFTING DEVICE

(75) Inventor: Tadashi Ichida, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/032,264

(22) Filed: Feb. 27, 1998

(51) Int. Cl.⁷ .............................. B60K 20/00; F16H 7/08
(52) U.S. Cl. .................................. 74/473.11; 74/473.13; 74/488; 474/101; 474/82
(58) Field of Search .............................. 474/101, 80, 82, 474/103, 104, 127, 78, 79, 160; 280/201, 212, 260, 261; 74/502.2, 489, 473.12, 473.11, 473.13

(56) References Cited

U.S. PATENT DOCUMENTS

| | | | |
|---|---|---|---|
| 3,742,777 | * 7/1973 | Mathauser | 74/502.2 X |
| 5,094,120 | * 3/1992 | Tagawa | 74/473.14 |
| 5,443,134 | 8/1995 | Gajek et al. | 188/344 |
| 5,564,310 | 10/1996 | Kishimoto | 74/489 |
| 5,890,979 | * 4/1999 | Wendler | 474/82 |
| 5,894,759 | * 4/1999 | Nakamura | 74/473.13 |

FOREIGN PATENT DOCUMENTS

| | | |
|---|---|---|
| 120571 | 10/1984 | (EP) . |
| 57-199192 | 6/1982 | (JP) . |
| 59-199386 | 11/1984 | (JP) . |
| 63-315390 | 12/1988 | (JP) . |
| 2-88385 | 3/1990 | (JP) . |
| 4-183696 | 6/1992 | (JP) . |
| 10-29583 | 2/1998 | (JP) . |
| 96/19376 | 6/1996 | (WO) . |

* cited by examiner

Primary Examiner—David A. Bucci
Assistant Examiner—Marcus Charles
(74) Attorney, Agent, or Firm—James A. Deland

(57) ABSTRACT

A bicycle shift control device for controlling a gas actuated shifting device includes a housing; a first gas valve actuating member; a second gas valve actuating member; a first shift member coupled to the housing for movement in a first direction, wherein the first shift member is operatively coupled to the first gas valve actuating member; and a second shift member coupled to the housing for movement in a second direction, wherein the second shift member is operatively coupled to the second gas valve actuating member.

24 Claims, 5 Drawing Sheets

BICYCLE SHIFT CONTROL DEVICE FOR CONTROLLING A GAS ACTUATED SHIFTING DEVICE

BACKGROUND OF THE INVENTION

The present invention is directed to control devices for bicycle transmissions and, more particularly, to a bicycle shift control device for controlling a gas actuated shifting device.

U.S. Pat. No. 6,066,057 entitled "Gas Actuated Transmission for a Bicycle" discloses various embodiments of a gas actuated shifting device for bicycles wherein air controlled shift valves in the form of toggle switches are used to selectively upshift and downshift a gas actuated transmission. Such shift valves can be placed in various positions on the bicycle. However, if the shift valves are formed as separate units, then it may be difficult to position the shift valves in an ergonomic manner.

Some shift control devices use two levers in close proximity to each other for respectively upshifting and downshifting the bicycle transmission. Such a device is disclosed in U.S. Pat. No. 5,564,310, for example. The shifting device disclosed in that patent includes two levers that operate in opposite directions to respectively upshift and downshift a bicycle transmission. Such a shifting device is very convenient, but such convenience so far has not been realized in a shift control device for controlling a gas actuated bicycle transmission.

SUMMARY OF THE INVENTION

The present invention is directed to a bicycle shift control device for controlling a gas actuated shifting device which is constructed to maximize ease of use by the rider. In one embodiment of the present invention, a bicycle shift control device for controlling a gas actuated shifting device includes a housing; a first gas valve actuating member; a second gas valve actuating member; a first shift member coupled to the housing for movement in a first direction, wherein the first shift member is operatively coupled to the first gas valve actuating member; and a second shift member coupled to the housing for movement in a second direction, wherein the second shift member is operatively coupled to the second gas valve actuating member.

In a more specific embodiment, the first shift member comprises a first shift lever coupled to the housing for rotating in the first direction around a first axis, and the second shift member comprises a second shift lever coupled to the housing for rotating in the second direction around a second axis. The first direction may be the same as the second direction, or the first direction may be opposite the second direction. A first biasing mechanism may be provided for biasing the first shift lever to a first home position, and a second biasing mechanism may be provided for biasing the second shift lever to a second home position. That way the first and second shift levers may automatically return to their respective home positions after the shifting operation is completed.

A base member also may be provided for mounting the housing to a handlebar. In this case the base member may include one or more slots for adjustably fastening the housing to the base member. To further facilitate ergonomic positioning of the shift levers, the housing may comprise a first housing section coupled to the first shift lever and a separate second housing section coupled to the second shift lever. The first and second housing sections may be fastened together to position the shift levers on a desired orientation relative to each other.

DETAILED DESCRIPTION OF THE EMBODIMENTS

Figure 1:
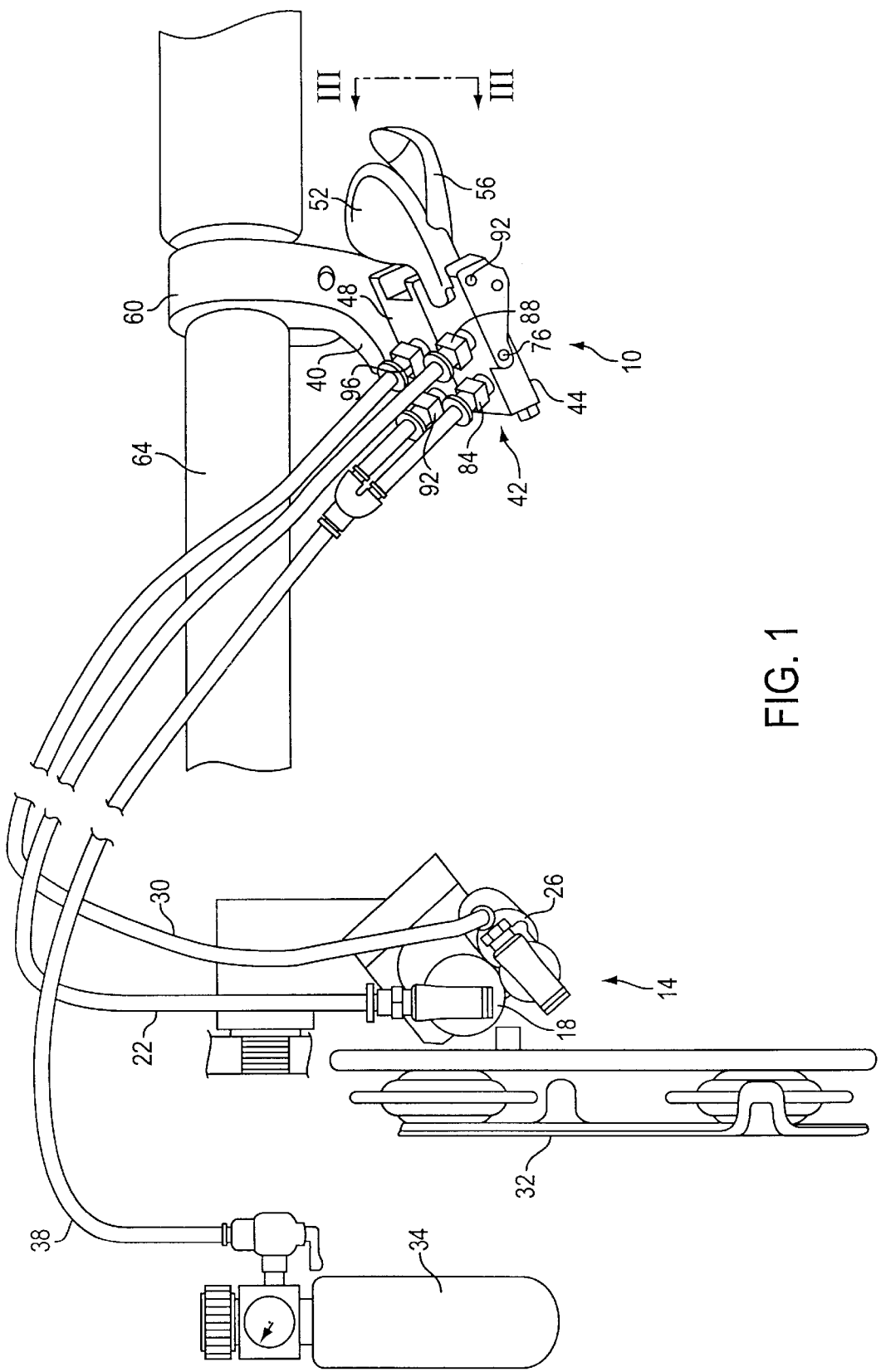
FIG. 1 shows a particular embodiment of a bicycle shift control device according to the present invention.

FIG. 1 shows a particular embodiment of a bicycle shift control device 10 according to the present invention coupled for operating a gas actuated bicycle transmission such as a derailleur 14. Derailleur 14 may be constructed in accordance with the teachings of U.S. Pat. No. 6,066,057 entitled "Gas Actuated Transmission for a Bicycle" and incorporated herein by reference. For example, derailleur 14 may include a downshift gas actuator 18 operated by compressed gas received through a gas line 22 and an upshift gas actuator 26 operated by compressed gas received through a gas line 30. Downshift gas actuator 18 and upshift gas actuator 26 move a chain guide 32 laterally to shift a bicycle chain (not shown) in a conventional manner. Compressed gas supplied by a compressed gas cylinder 34 is supplied to shift control device 10 through an input gas line 38 and is then selectively routed to downshift gas actuator 18 and upshift gas actuator 26 by shift control device 10.

Figure 2:
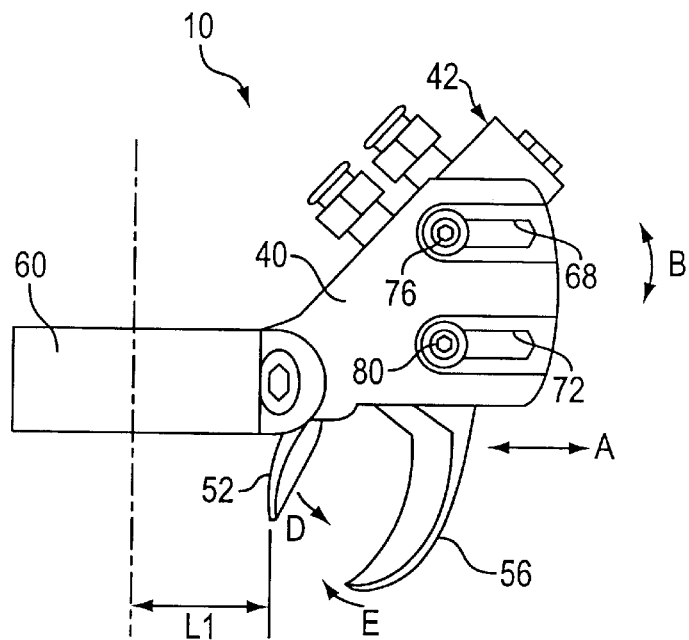
FIG. 2 is a top view of the shift control device shown in FIG. 1.
Figure 3:
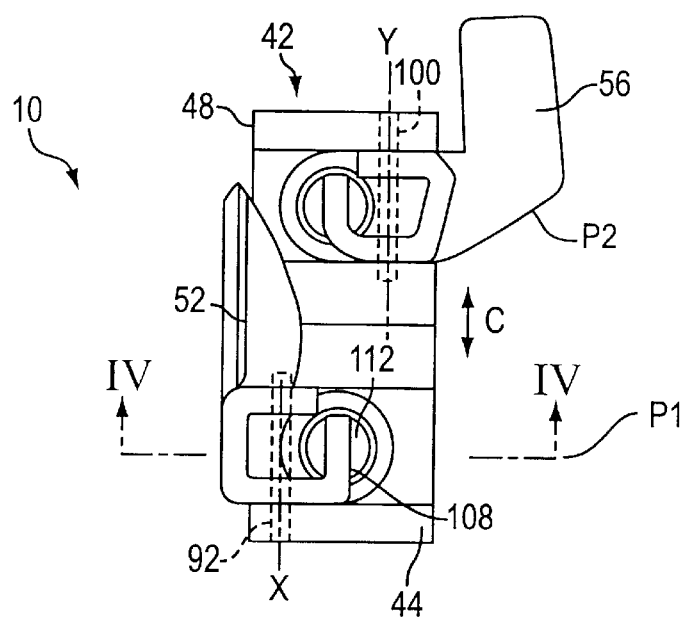
FIG. 3 is a view taken along line III—III in FIG. 1.

As shown in FIGS. 1–3, shift control device 10 includes a base member 40, a housing 42 comprising a first housing section 44 and a second housing section 48, and shift members in the form of shift levers 52 and 56. Base member 40 has a handlebar attachment collar 60 for attaching shift control device 10 to a handlebar 64 and parallel oval slots 68 and 72 for adjustably attaching housing 42 to base member 40 through fasteners 76 and 80. Slots 68 and 72 allow housing 42 to be adjusted in the direction of arrow A shown in FIG. 2 for varying the length L1 between shift lever 52 and the center of collar 60 (and hence handlebar 64) to accommodate the size of the hand of a particular rider. Also, slots 68 and 72 allow housing 42 to be rotationally adjusted in the direction of arrow B to further accommodate the preferences of various riders. In this embodiment, first housing section 44 and second housing section 48 are formed as separate sections that are fastened together by fasteners 76 and 80. Thus, if desired the spacing between first housing section 44 and second housing section 48 may be adjusted in the direction of arrow C shown in FIG. 3 to yet further accommodate the preferences of various riders.

First housing section 44 has a first input gas opening 84 for receiving compressed gas from compressed gas cylinder 34 and a first output gas opening 88 for supplying compressed gas to downshift gas actuator 18. Lever 52 is pivotably coupled to first housing section 44 through a pivot shaft 92 so that lever 52 pivots in a plane P1 around an axis X in a direction indicated by arrow D from a home position shown in solid line in FIG. 2. Similarly, second housing section 48 has a first input gas opening 92 for receiving compressed gas from compressed gas cylinder 34 and a first output gas opening 96 for supplying compressed gas to upshift gas actuator 26. Lever 56 is pivotably coupled to second housing section 48 through a pivot shaft 100 so that lever 56 pivots in a plane P2 around an axis Y in a direction indicated by an arrow E from a home position shown by the solid line in FIG. 2. In This embodiment, axis X is parallel to axis Y, and plane P1 is parallel to plane P2. As discussed in more detail below, each lever 52 and 56 automatically returns to its home position after the shifting operation.

Figure 4:
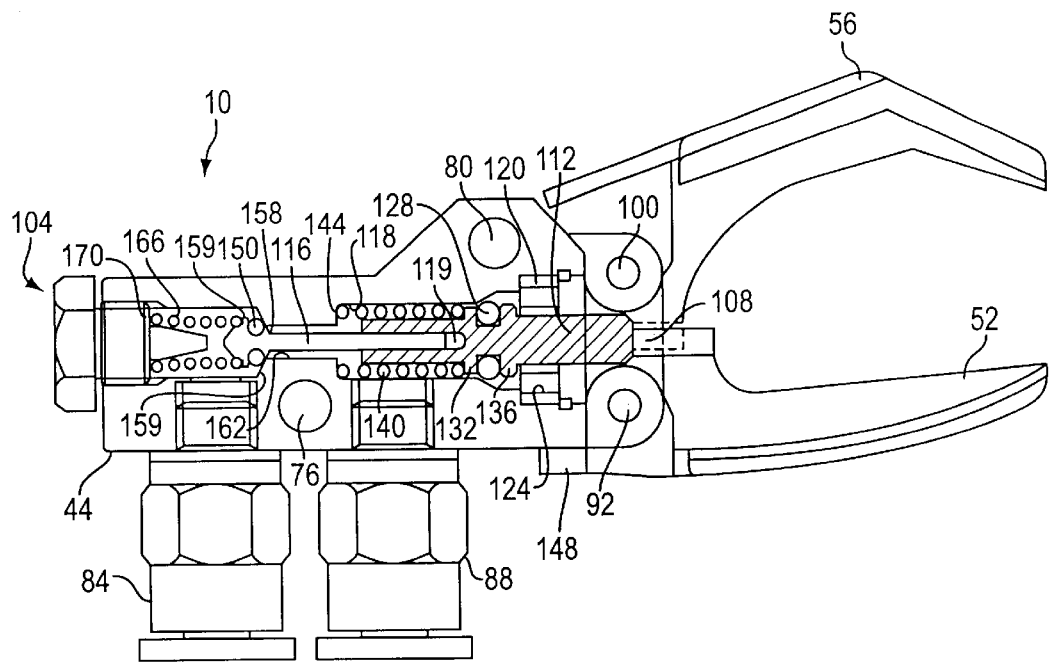
FIG. 4 is a view taken along line IV—IV in FIG. 3 showing a particular embodiment of an air valve according to the invention in an inoperative state.
Figure 5:
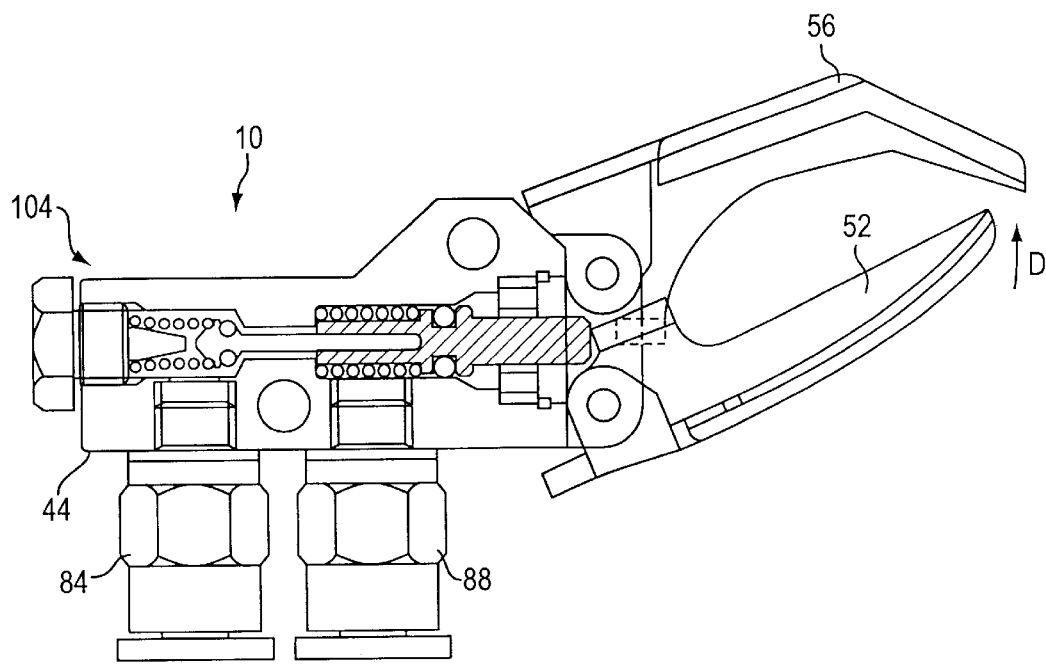
FIG. 5 is a view of the air valve of FIG. 4 in an operative state.

FIG. 4 is a view taken along line IV—IV in FIG. 3 showing a particular embodiment of a gas valve 104 according to the invention that is disposed within first housing section 44. Gas valve 104 is used to selectively communicate compressed gas from input gas opening 84 to output gas opening 88. Gas valve 104 is shown in FIG. 4 in the inoperative state where the compressed gas at gas input opening 84 is prevented from passing to gas output opening 88, and gas valve 104 is shown in FIG. 5 in an operative state where the compressed gas at gas input opening 84 is allowed to pass to gas output opening 88. The same type of gas valve (not shown) is disposed in second housing section 48 for operation by lever 56, so a detailed description of that gas valve shall be omitted.

As shown in FIG. 4, an abutment 108 on shift lever 52 contacts a gas valve actuating member 112 disposed within a valve bore 118. Gas valve actuating member 112 slidably meshes with a valve pin 116 that is also disposed within valve bore 118. In the position shown in FIG. 4, a space 119 is disposed between gas valve actuating member 112 and valve pin 116 for reasons discussed below. Gas valve actuating member 112 is fitted within an annular gas exhaust collar 120 that has a plurality of circumferentially spaced exhaust openings 124 for allowing gas supplied to downshift gas actuator 18 to exhaust after the shifting operation. An O-ring seal 128 is fitted around the outer peripheral surface of gas actuating member 112 between a first abutment 132 and a second abutment 136. A spring 140 is disposed between first abutment 132 and an abutment 144 formed by the inner peripheral surface of valve bore 118 for biasing gas valve actuating member 112 to the right to thereby bias shift lever 52 to the home position shown in FIG. 4. Shift lever 52 includes a motion limiting abutment 148 which contacts the outer surface of first housing section 44 to limit clockwise rotation of shift lever 52 and to position shift lever 52 in its home position. Shift lever 56 has a similar abutment (not shown) to limit counterclockwise rotation of shift lever 56 and to position shift lever 56 in its home position.

An O-ring seal 150 is disposed between an abutment 154 and an abutment 158 on valve pin 116 for contacting an abutment 159 formed by the inner peripheral surface of valve bore 118 to prevent the flow of gas from input gas opening 84 through an intermediate passage leading to output gas opening 88. A spring 166 is disposed between abutment 154 and an abutment 170 on a bore capping screw 174 to bias valve pin 116 to the closed position shown in FIG. 4.

In operation, lever 52 is rotated in the direction indicated by arrow D to actuate the derailleur 14 in the downshifting direction. Since there is a space 119 between gas valve actuating member 112 and valve pin 116, valve pin 116 initially remains stationary as a result of the biasing force of spring 166 while O-ring 128 on gas valve actuating member 112 engages the inner peripheral surface of valve bore 118 to prevent gas from flowing to exhaust collar 120. Upon further rotation of shift lever 52, gas valve actuating member 112 pushes valve pin 116 to the left, thus unseating O-ring 150 from the abutment 159 and allowing gas to flow from input gas opening 84, through intermediate passage 162 and through output gas opening 88 to actuate downshift gas actuator 18.

Thereafter, the rider removes his or her thumb or finger from shift lever 52, and shift lever 52 automatically rotates clockwise as a result of the biasing of spring 140. During this motion, valve pin 116 initially moves to the right so that O-ring 150 is reseated on abutment 159 to again prevent gas from flowing from gas input opening 84 through intermediate passage 162. Thereafter, gas valve actuating member 112 continues moving to the right to unseat O-ring 128 from the inner peripheral surface of valve bore 118 to allow the compressed gas that actuated downshift gas actuator 18 to exhaust through exhaust collar 120.

The operation of the gas valve disposed within second housing section 48 is the same.

While the above is a description of various embodiments of the present invention, further modifications may be employed without departing from the spirit and scope of the present invention. For example, the size, shape, location or orientation of the various components may be changed as desired. The functions of one element may be performed by two, and vice versa.

Figure 6:
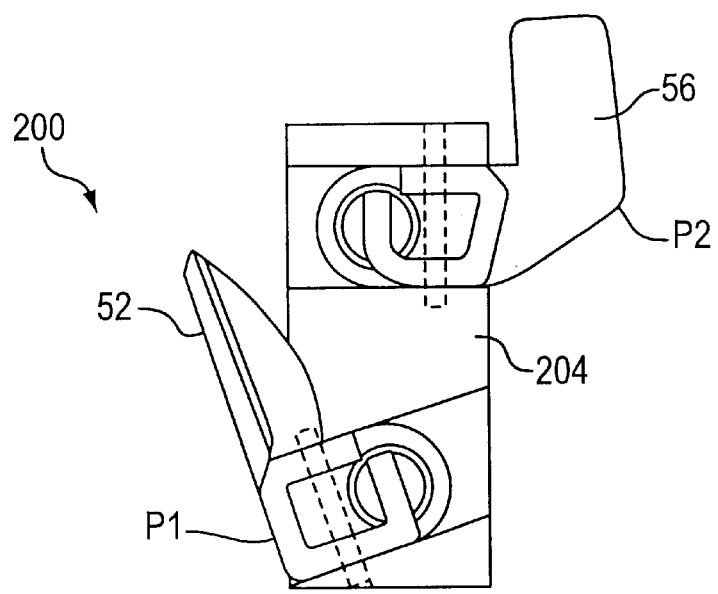
FIG. 6 shows an alternative embodiment of a bicycle shift control device according to the present invention.

FIG. 6 shows an alternative embodiment of a bicycle shift control device 200 according to the present invention. In this embodiment, a housing 204 is formed as one piece rather than the two piece housing 42 in the previous embodiment. Furthermore, the rotational plane P1 of shift lever 52 is inclined relative to the rotational plane P2 of shift lever 56.

Figure 7:
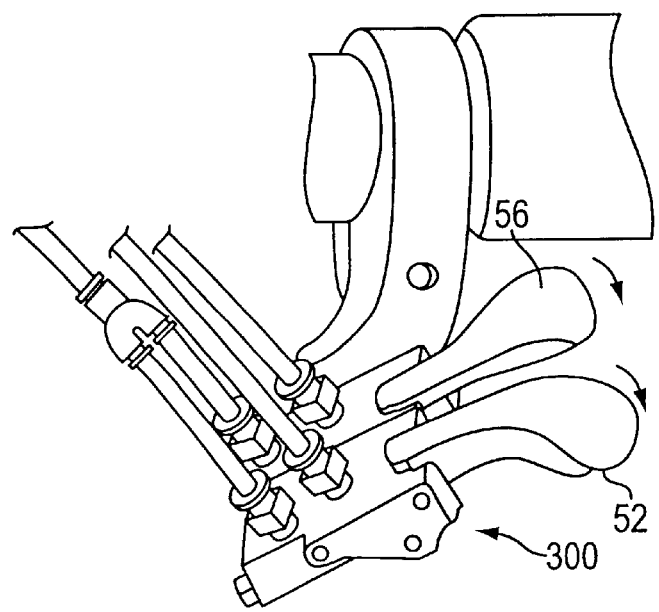
FIG. 7 shows another alternative embodiment of a bicycle shift control device according to the present invention.

FIG. 7 shows another alternative embodiment of a bicycle shift control device 300 according to the present invention. In this embodiment, shift levers 52 and 56 are structured to pivot in the same direction.

Figure 8:
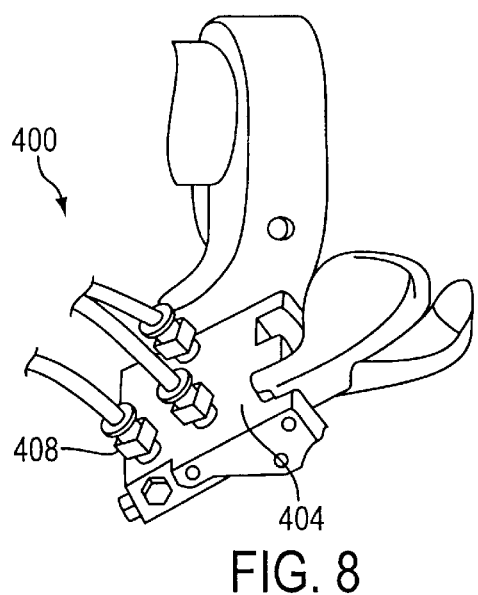
FIG. 8 shows another alternative embodiment of a bicycle shift control device according to the present invention.

FIG. 8 shows another alternative embodiment of a bicycle shift control device 400 according to the present invention. This embodiment has a one-piece housing 404 similar to housing 204 in FIG. 6. However, in this embodiment there is only a single gas input opening 408 for supplying compressed gas to the two gas actuating valves disposed in housing 404. A single bore within housing 404 may be used to feed the two gas actuating valves.

Figure 9:
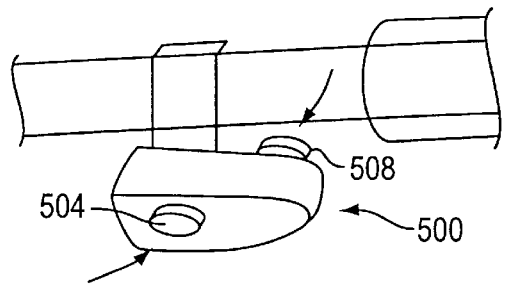
FIG. 9 shows another alternative embodiment of a bicycle shift control device according to the present invention.

FIG. 9 shows another alternative embodiment of a bicycle shift control device 500 according to the present invention. In this embodiment, shift levers 52 and 56 have been replaced by buttons 504 and 508 that move in the opposite directions indicated by the arrows. Of course, the buttons could be disposed on the same side of the housing so that the buttons move in the same direction, if desired.

Figure 10:
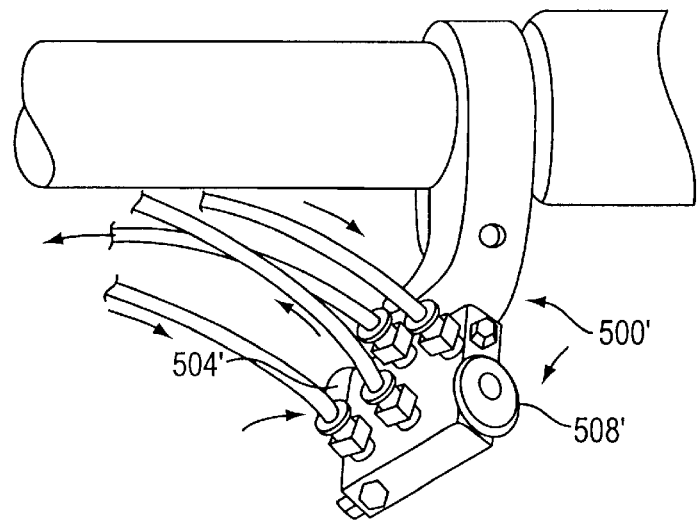
FIG. 10 shows another alternative embodiment of a bicycle shift control device according to the present invention.

FIG. 10 shows another alternative embodiment of a bicycle shift control device 500' according to the present invention. This embodiment also uses buttons 504' and 508', but the buttons are located on the opposite ends of the housing.

Thus, the scope of the invention should not be limited by the specific structures disclosed. Instead, the true scope of the invention should be determined by the following claims.

What is claimed is:

1. A bicycle shift control device for controlling a gas actuated shifting device comprising:

a housing;

a base member for mounting the housing to a handlebar;

a first gas valve actuating member;

a second gas valve actuating member;

a first shift member comprising a first shift lever coupled to the housing for rotating in a first direction around a first axis, wherein the first shift member is operatively coupled to the first gas valve actuating member;

a second shift member comprising a second shift lever coupled to the housing for rotating in a second direction around a second axis, wherein the second shift member is operatively coupled to the second gas valve actuating member; and wherein the base member includes a first slot, and further comprising a first fastener extending through the first slot for attaching the housing to the base member.

2. The device according to claim 1 wherein the first axis is parallel to the second axis.

3. The device according to claim 1 wherein the first direction is opposite the second direction.

4. The device according to claim 1 wherein the first direction is the same as the second direction.

5. The device according to claim 1 wherein the first shift lever rotates in a first plane, and wherein the second shift lever rotates in a second plane.

6. The device according to claim 1 further comprising:

a first biasing mechanism for biasing the first shift lever to a first home position; and a second biasing mechanism for biasing the second shift lever to a second home position.

7. The device according to claim 1 wherein the base member includes a second slot, and further comprising a second fastener extending through the second slot for attaching the housing to the base member.

8. The device according to claim 1 further comprising:

a first gas input opening disposed on the housing for providing gas to the first gas valve actuating member; and a second gas input opening disposed on the housing for providing gas to the second gas valve actuating member.

9. The device according to claim 5 wherein the first plane is parallel to the second plane.

10. The device according to claim 5 wherein the first plane is inclined relative to the second plane.

11. The device according to claim 7 wherein the first slot is parallel to the second slot.

12. A bicycle shift control device for controlling a gas actuated shifting device comprising:

a housing including:
a first housing section; and
a second housing section;

a base member for mounting the housing to a handlebar;

a first gas valve actuating member;

a second gas valve actuating member;

a first shift member comprising a first shift lever coupled to the first housing section for rotating in a first direction around a first axis, wherein the first shift member is operatively coupled to the first gas valve actuating member;

a second shift member comprising a second shift lever coupled to the second housing section for rotating in a second direction around a second axis, wherein the second shift member is operatively coupled to the second gas valve actuating member; and wherein the base member includes a first slot, and further comprising a first fastener extending through the first slot for attaching the housing to the base member.

13. The device according to claim 12 wherein the base member includes a second slot, and further comprising a second fastener extending through the second slot for attaching the housing to the base member.

14. The device according to claim 13 wherein the first slot is parallel to the second slot.

15. A bicycle shift control device for controlling a gas actuated shifting device comprising:

a housing;

a first gas valve actuating member;

a second gas valve actuating member;

a first shift member coupled to the housing for movement in a first direction, wherein the first shift member is operatively coupled to the first gas valve actuating member;

a second shift member coupled to the housing for movement in a second direction, wherein the second shift member is operatively coupled to the second gas valve actuating member;

wherein the first shift member includes:
a first lever portion; and
a first abutment for operating the first gas actuating member;
wherein the first lever portion pivots around a first axis;
wherein the first lever portion is disposed on a first side of the first axis; and
wherein the first abutment is disposed on an opposite second side of the first axis when viewed perpendicular to the first axis.

16. The device according to claim 15 wherein the second shift member includes:

a second lever portion; and
a second abutment for operating the second gas actuating member;
wherein the second lever portion pivots around a second axis;
wherein the second lever portion is disposed on a first side of the second axis; and
wherein the second abutment is disposed on an opposite second side of the second axis when viewed perpendicular to the second axis.

17. A bicycle shift control device for controlling a gas actuated shifting device comprising:

a housing;

a first gas valve actuating member;

a second gas valve actuating member;

a first shift member coupled to the housing for movement in a first direction, wherein the first shift member is operatively coupled to the first gas valve actuating member;

a second shift member coupled to the housing for movement in a second direction, wherein the second shift member is operatively coupled to the second gas valve actuating member;

wherein the first shift member is pivotably coupled to the housing for pivoting around a first axis, and wherein the first shift member comprises:
a first first shift member end extending in a direction having a component perpendicular to the first axis; and
a second first shift member end protruding from an end of the first first shift member end in a direction having a component parallel to the first axis.

18. The device according to claim 17 wherein the second shift member is pivotably coupled to the housing for pivoting around a second axis, and wherein the second shift member comprises:
- a first second shift member end extending in a direction having a component perpendicular to the second axis; and
- a second second shift member end protruding from an end of the first second shift member end in a direction having a component parallel to the second axis.

19. A bicycle shift control device for controlling a gas actuated shifting device comprising:
- a housing;
- a first gas valve actuating member;
- a second gas valve actuating member;
- a first shift member coupled to the housing for movement in a first direction, wherein the first shift member is operatively coupled to the first gas valve actuating member;
- a second shift member coupled to the housing for movement in a second direction, wherein the second shift member is operatively coupled to the second gas valve actuating member;
- wherein the first shift member is pivotably coupled to the housing for pivoting around a first axis, and wherein the first shift member comprises:
  - a first first shift member portion disposed in the housing for pivoting around the first axis;
  - wherein the first first shift member portion disposed in the housing has a first first shift member width in the direction of the first axis;
  - a second first shift member portion extending from the first first shift member portion and having a first finger contacting surface forming a terminating end of the first shift member;
  - wherein the first finger contacting surface has a second first shift member width in the direction of the first axis that is greater than the first first shift member width.

20. The device according to claim 19 wherein the first shift member includes a first abutment for operating the first gas actuating member.

21. The device according to claim 19 wherein the second shift member is pivotably coupled to the housing for pivoting around a second axis, and wherein the second shift member comprises:
- a first second shift member portion disposed in the housing for pivoting around the second axis;
- wherein the first second shift member portion disposed in the housing has a first second shift member width in the direction of the second axis;
- a second second shift member portion extending from the first second shift member portion and having a second finger contacting surface forming a terminating end of the second shift member;
- wherein the second finger contacting surface has a second second shift member width in the direction of the second axis that is greater than the first second shift member width.

22. The device according to claim 20 wherein the first finger contacting surface is disposed on a first side of the first axis, and wherein the first abutment is disposed on an opposite second side of the first axis when viewed perpendicular to the first axis.

23. The device according to claim 21 wherein the first shift member includes a first abutment for operating the first gas actuating member, and wherein the second shift member includes a second abutment for operating the second gas actuating member.

24. The device according to claim 23 wherein the first finger contacting surface is disposed on a first side of the first axis, wherein the first abutment is disposed on an opposite second side of the first axis when viewed perpendicular to the first axis, wherein the second finger contacting surface is disposed on a first side of the second axis, and wherein the second abutment is disposed on an opposite second side of the second axis when viewed perpendicular to the second axis.

* * * * *